United States Patent [19]
Yamamoto et al.

[11] Patent Number: 5,241,005
[45] Date of Patent: Aug. 31, 1993

[54] HEAT-RESISTANT RESIN COMPOSITIONS WITH A PEARLY LUSTER

[75] Inventors: Toshihiro Yamamoto; Masao Kimura, both of Kawasaki, Japan

[73] Assignees: Nippon Steel Chemical Co., Ltd.; Nippon Steel Corporation, both of Tokyo, Japan

[21] Appl. No.: 939,973

[22] Filed: Sep. 4, 1992

Related U.S. Application Data

[63] Continuation of Ser. No. 635,028, Dec. 28, 1990, abandoned.

[51] Int. Cl.$^5$ .................. C08L 69/00; C08L 33/12
[52] U.S. Cl. ........................... 525/148; 525/146
[58] Field of Search ............................ 525/148

[56] References Cited

U.S. PATENT DOCUMENTS

| | | | |
|---|---|---|---|
| 4,045,514 | 8/1977 | Iwahashi et al. | 525/148 |
| 4,172,103 | 10/1979 | Serini et al. | 525/76 |
| 4,774,289 | 9/1988 | Kress | 525/148 |
| 4,950,716 | 8/1990 | Fischer | 525/148 |

FOREIGN PATENT DOCUMENTS

| | | |
|---|---|---|
| 43-13384 | 6/1968 | Japan . |
| 47-16063 | 5/1972 | Japan . |
| 504 | 1/1977 | Japan . |
| 53-1246 | 1/1978 | Japan . |
| 56-28233 | 3/1981 | Japan . |
| 56-28234 | 3/1981 | Japan . |
| 56-28240 | 3/1981 | Japan . |

OTHER PUBLICATIONS

*Polymer Preprints, Japan (English Edition),* vol. 39, No. 1, pp. 5-7, E35 and 47. (SPSJ 39th Annual Meeting, Kyoto, Japan, May 29-31, 1990).

Primary Examiner—David J. Buttner
Attorney, Agent, or Firm—Nikaido, Marmelstein, Murray & Oram

[57] ABSTRACT

Heat-resistant resin compositions with an excellent pearly luster of this invention consist essentially of polycarbonates prepared from bisphenol A or its derivatives of the following general formula (I)

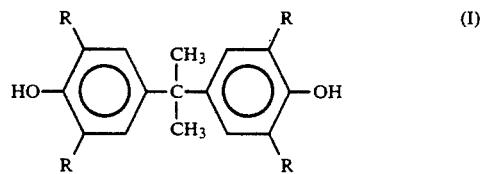

in which R is hydrogen, a halogen, or a lower alkyl group and methyl methacrylate-α-methylstyrene copolymers with a weight average molecular weight of 30,000 to 200,000 and are useful for molding industrial articles requiring heat resistance.

2 Claims, No Drawings

HEAT-RESISTANT RESIN COMPOSITIONS WITH A PEARLY LUSTER

This application is a continuation of application Ser. No. 635,028 filed Dec. 28, 1990, now abandoned.

FIELD OF THE INVENTION AND RELATED ART STATEMENT

This invention relates to heat-resistant resin compositions with a pearly luster essentially consisting of polycarbonates and methyl methacrylate-α-methylstyrene copolymers.

Polymer blends of aromatic polycarbonates, particularly those based on bisphenol A, and poly(methyl methacrylate) are known to be moldable into articles of pearly luster as described, for example, in Japan Tokkyo Koho Nos. 43-13,384 (1968) and 47-16,063 (1972), Japan Tokkyo Kokai Koho No. 53-1,246 (1978), and U.S. Pat. No. 4,045,514.

These resin compositions are suitable for a wide variety of applications because of their singular appearance, but their insufficient heat resistance limits their applications to ornaments and sundry goods.

A number of proposals have been made to improve the heat resistance of the aforesaid blends of polycarbonate and poly(methyl methacrylate). Japan Tokkyo Kokai Koho No. 56-28,233 (1981), for example, attempts to improve the heat resistance by adding a polymer as third-component to a blend of polycarbonates and styrene-methyl methacrylate copolymers. This attempt, however, has resulted in the loss of pearly luster. Similar reports are found in Japan Tokkyo Kokai Koho Nos. 56-28,240 (1981) and 56-28,234 (1981). U.S. Pat. No. 4,172,103 also makes a report on similar compositions but none on a pearly luster.

Thus none of the polycarbonate-based polymer blends known so far has both a pearly luster and good heat resistance.

OBJECT AND SUMMARY OF THE INVENTION

It is an object of this invention to provide polycarbonate-based resin compositions having not only a pearly luster but also excellent heat resistance.

Another object of this invention is to provide heat-resistant resin compositions with a pearly luster essentially consisting of polycarbonates prepared from bisphenol A or its derivatives and methyl methacrylate-α-methylstyrene copolymers.

This invention accordingly relates to heat-resistant resin compositions with a pearly luster essentially consisting of 90 to 10% by weight of polycarbonates prepared from bisphenol A or its derivatives of the following general formula (I)

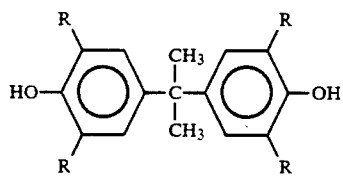

in which R is hydrogen, a halogen, or a lower alkyl group and 10 to 90% by weight of methyl methacrylate-α-methylstyrene copolymers with a weight average molecular weight of 30,000 to 200,000.

The polycarbonates are prepared from bisphenol A or its derivatives of the aforesaid general formula (I) in this invention. In the general formula (I), the halogen is fluorine, chlorine, bromine, or iodine, preferably chlorine, and the lower alkyl group is methyl or ethyl. Such polycarbonates are prepared by a known method such as the reaction of bisphenol A or its derivatives with phosgene or the transesterification of bisphenol A or its derivatives with a carbonate ester such as dipheny carbonate. Polycarbonates of this type are commercially available and such commercial materials are suitable for use in this invention. The polycarbonates should preferably have a weight average molecular weight of 20,000 to 50,000.

The methyl methacrylate-α-methylstyrene copolymers to be used in this invention should have a weight average molecular weight of 30,000 to 200,000, preferably 60,000 to 120,000, and contain 70 to 90 mol %, preferably 75 to 85 mol %, of methyl methacrylate unit. The copolymers having a weight average molecular weight of less than 30,000 suffer losses of their mechanical properties while those having a weight average molecular weight in excess of 200,000 not only show a too high melt viscosity but also undergo thermal degradation. The methyl methacrylate-α-methylstyrene copolymers containing more than 90 mol % of methyl methacrylate unit do not exhibit sufficient heat resistance while those containing less than 70 mol % undergo thermal degradation. The copolymers can be prepared readily by radical polymerization in the usual manner, for example, by a bulk or emulsion process.

The heat-resistant resin compositions with a pearly luster of this invention contain 10 to 90% by weight, preferably 30 to 10% by weight, of the methyl methacrylate-α-methylstyrene copolymers. A good pearly luster cannot be obtained at a proportion of the methyl methacrylate-α-methylstyrene copolymers of less than 10% by weight whereas both pearly luster and heat resistance are affected adversely at a proportion in excess of 90% by weight. A particularly good pearly luster can be obtained by controlling the proportion of methyl methacrylate-α-methylstyrene copolymers in the range from 30 to 70% by weight.

The aforesaid polycarbonates and methyl methacrylate-α-methylstyrene copolymers can be blended in the usual manner, for example, by melting in a variety of extruders or by dissolving in solvents.

A variety of additives may be added to the thermoplastic resin compositions of this invention during blending or molding in order to protect the compositions against thermal degradation or hydrolysis or to provide them with antistatic or fire-resistant properties; for example, antioxidants such as 1,1,3-tris(2-methyl-4-hydroxy-5-tert-butylphenyl)butane for improvement of heat resistance, processing aids such as tetrakis(2,4-di-tert-butylphenyl)-4,4'-biphenylene phosphonite for suppression of hydrolysis, antistatic agents such as polyoxyethylene alkylamines for suppression of static charge generation, and flame retardants such as decabromodiphenyl oxide for improvement of fire resistance.

The heat-resistant resin compositions with a pearly luster of this invention are superior to the conventional resin compositions with a pearly luster in heat resistance and useful as molding materials for not only ornaments and sundry goods but also industrial parts requiring heat resistance such as parts and housings of electric appliances, office machines, and copying machines, and automotive parts.

DETAILED DESCRIPTION OF THE PREFERRED EMBODIMENT

This invention will be explained in detail below with reference to the accompanying examples and comparative examples.

EXAMPLES 1-9

Bisphenol A-based polycarbonate (Novarex 7025A with a weight average molecular weight of 45,000 commercially available from Mitsubishi Kasei Corporation; hereinafter referred to as PC) and methyl methacrylate-α-methylstyrene copolymer with a weight average molecular weight of 70,000 (containing 80 mol % of methyl methacrylate; hereinafter referred to as MS α) were dry-blended at weight ratios of 90:10, 80:20, 70:30, 60:40, 50:50, 40:60, 30:70, 20:80, and 10:90, molded by a Minimax injection molding machine manufactured by Custom Scientific Instrument (U.S.A.) into specimens, and tested for the Vicat softening point, the Tensile strength and the Tensile impact strength. The results are shown in Table 1.

As is apparent from Table 1, the specimens from the resin compositions of this invention not only retain good heat resistance characteristic of PC but also have an excellent pearly luster.

COMPARATIVE EXAMPLE 1

PC was molded into specimens and tested for the Vicat softening point, the Tensile strength and the Tensile impact strength as in the aforesaid Examples. The results are shown in Table 1.

COMPARATIVE EXAMPLE 2

MS α with a weight average molecular weight of 70,000 was molded into specimens and tested for the Vicat softening point, the Tensile strength and the Tensile impact strength as in the aforesaid Examples. The results are shown in Table 1.

COMPARATIVE EXAMPLES 3-4

PC was blended with methyl methacrylate-styrene copolymer (abbreviated as PMS) at weight ratios of 20:80 and 50:50, molded into specimens, and tested for the Vicat softening point, the Tensile strength and the Tensile impact strength as in the aforesaid Examples. The results are shown in Table 1.

COMPARATIVE EXAMPLES 5-6

PC was blended with poly(methyl methacrylate) (abbreviated as PMMA) at weight ratios of 20:80 and 50:50, molded into specimens, and tested for the Vicat softening point, the Tensile strength and the Tensile impact strength. The results are shown in Table 1.

TABLE 1

|  | PC/MS α | Vicat softening point, °C. | Pearly luster*1 | Tensile strength kg/mm² | Tensile impact strength kg-cm |
|---|---|---|---|---|---|
| Example |  |  |  |  |  |
| 1 | 90/10 | 150 | ◯ | 850 | 10.1 |
| 2 | 80/20 | 148 | ⊚ | 890 | 9.2 |
| 3 | 70/30 | 146 | ⊚ | 850 | 5.7 |
| 4 | 60/40 | 144 | ⊚ | 850 | 3.3 |
| 5 | 50/50 | 143 | ⊚ | 850 | 2.6 |
| 6 | 40/60 | 142 | ⊚ | 850 | 2.4 |
| 7 | 30/70 | 139 | ⊚ | 860 | 2.4 |
| 8 | 20/80 | 137 | ⊚ | 870 | 1.7 |
| 9 | 10/90 | 136 | ◯ | 870 | 1.7 |
| Comparative example |  |  |  |  |  |
| 1 | 100/0 | 154 | X | 850 | 9.2 |
| 2 | 0/100 | 136 | X | 870 | 1.7 |
| 3 | 50/50*2 | 126 | ◯ | 680 | 1.6 |
| 4 | 20/80*2 | 108 | ◯ | 700 | 1.5 |
| 5 | 50/50*3 | 129 | ◯ | 670 | 1.6 |
| 6 | 20/80*3 | 102 | ◯ | 700 | 1.4 |

(Notes) *1: The pearly luster was evaluated by visual observation of the molded specimens in three ratings as follows:
⊚ extremely good pearly luster.
◯ pearly luster.
X no pearly luster.
*2: PC/PMS
*3: PC/PMMA As is apparent from the results in Table 1, the resin compositions of Examples 1 to 9 not only have a pearly luster but also show good heat resistance and are superior in these properties to the conventional resins with a pearly luster of Comparative Examples 3 to 6.

What is claimed is:

1. Heat-resistant resin compositions consisting essentially of: (1) 70 to 30% by weight polycarbonates prepared from bisphenol A or its derivatives of the following general formula (I)

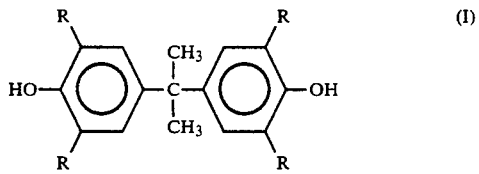

in which R is hydrogen, a halogen, or a lower alkyl group; and (2) 30 to 70% by weight of copolymers consisting of methyl methacrylate and α-methylstyrene having a weight average molecular weight of 30,000 to 200,000 which contain 70 to 90 mol % methyl methacrylate.

2. The composition claimed in claim 1 which consists of said polycarbonate and said copolymer.

* * * * *